United States Patent
Bosma et al.

(10) Patent No.: US 7,708,081 B2
(45) Date of Patent: May 4, 2010

(54) WELLBORE SYSTEM EXTENDING THROUGH A SALT LAYER

(75) Inventors: Martin Gerard Rene Bosma, Assen (NL); Erik Kerst Cornelissen, Rijswijk (NL)

(73) Assignee: Shell Oil Company, Houston, TX (US)

( * ) Notice: Subject to any disclaimer, the term of this patent is extended or adjusted under 35 U.S.C. 154(b) by 73 days.

(21) Appl. No.: 11/792,886

(22) PCT Filed: Dec. 13, 2005

(86) PCT No.: PCT/EP2005/056718

§ 371 (c)(1),
(2), (4) Date: Oct. 1, 2007

(87) PCT Pub. No.: WO2006/063988

PCT Pub. Date: Jun. 22, 2006

(65) Prior Publication Data
US 2008/0156492 A1 Jul. 3, 2008

(30) Foreign Application Priority Data
Dec. 15, 2004 (EP) .................................. 04257819

(51) Int. Cl.
*E21B 33/138* (2006.01)
*E21B 33/127* (2006.01)
(52) U.S. Cl. ...................... 166/387; 166/120; 166/212; 166/285
(58) Field of Classification Search ........................ None
See application file for complete search history.

(56) References Cited

U.S. PATENT DOCUMENTS

| 4,462,714 A | 7/1984 | Smith et al. .................... 405/55 |
| 7,059,415 B2 | 6/2006 | Bosma et al. ................ 166/313 |
| 2004/0055758 A1 | 3/2004 | Brezinski et al. ............. 166/384 |
| 2004/0144538 A1 | 7/2004 | Richard et al. ............... 166/294 |
| 2004/0149431 A1 * | 8/2004 | Wylie et al. ............... 166/242.1 |

FOREIGN PATENT DOCUMENTS

| EP | 1300545 | 4/2003 |
| WO | WO03008756 | 1/2003 |
| WO | WO2004057715 | 7/2004 |

OTHER PUBLICATIONS

Pattillo, P. et al: "Effect of Nonuniform Loading on Conventional Collapse Resistance", Sep. 2004, pp. 156-163.
Wilson, S. et al: "Assessment of Salt Loading on Well Casings", Mar. 1, 2003, pp. 13-14.

* cited by examiner

*Primary Examiner*—Zakiya W. Bates

(57) ABSTRACT

A wellbore system is provided including a wellbore formed in an earth formation, the wellbore extending into a salt layer of the earth formation. The wellbore system comprises a tubular conduit arranged in the wellbore whereby at least a portion of the tubular conduit is surrounded by the salt layer whereby an annular space is formed between said portion of the tubular conduit and the wellbore wall. The wellbore system further comprises an annular body of a- resilient material arranged in said annular space and extending substantially the length of said portion of the tubular conduit surrounded by the salt layer.

8 Claims, 2 Drawing Sheets

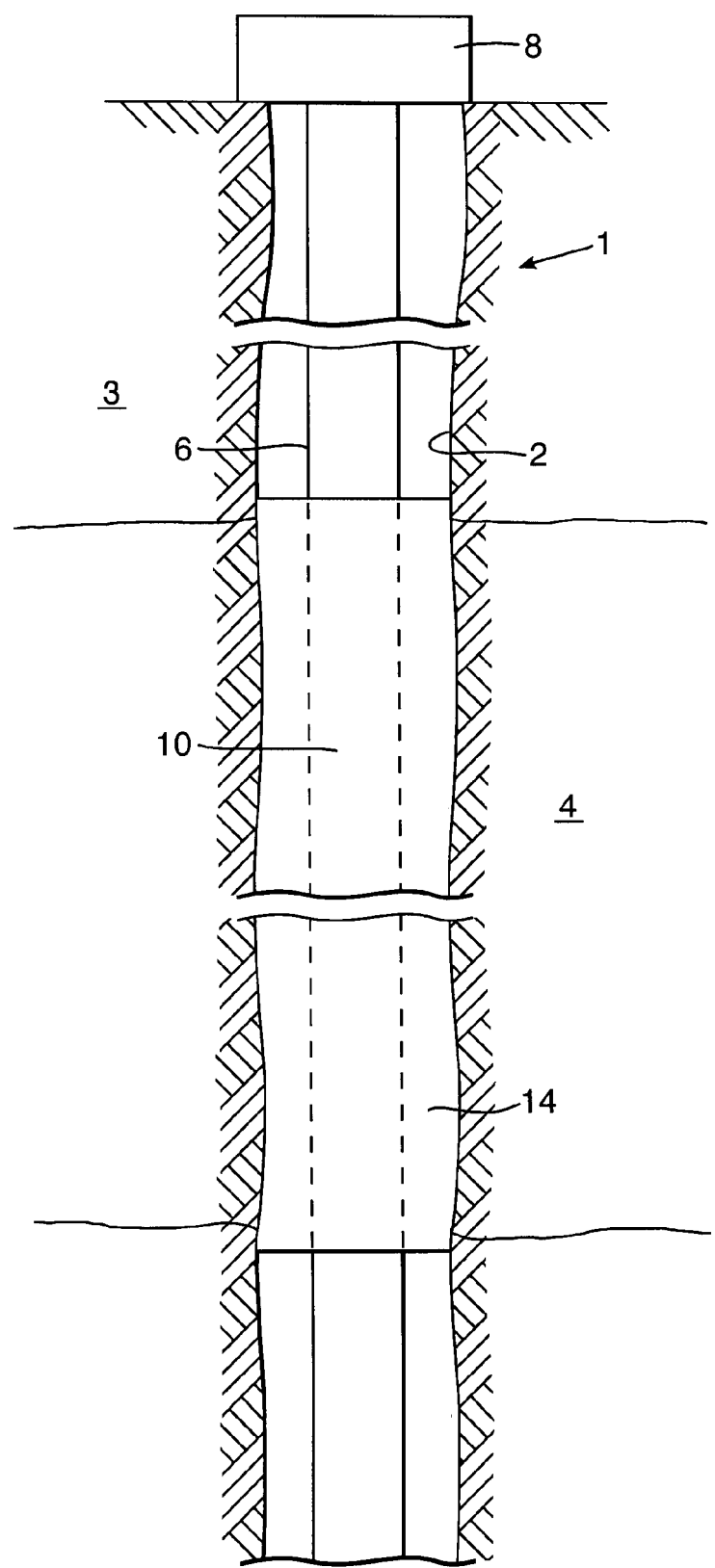

WELLBORE SYSTEM EXTENDING THROUGH A SALT LAYER

Figure 1:
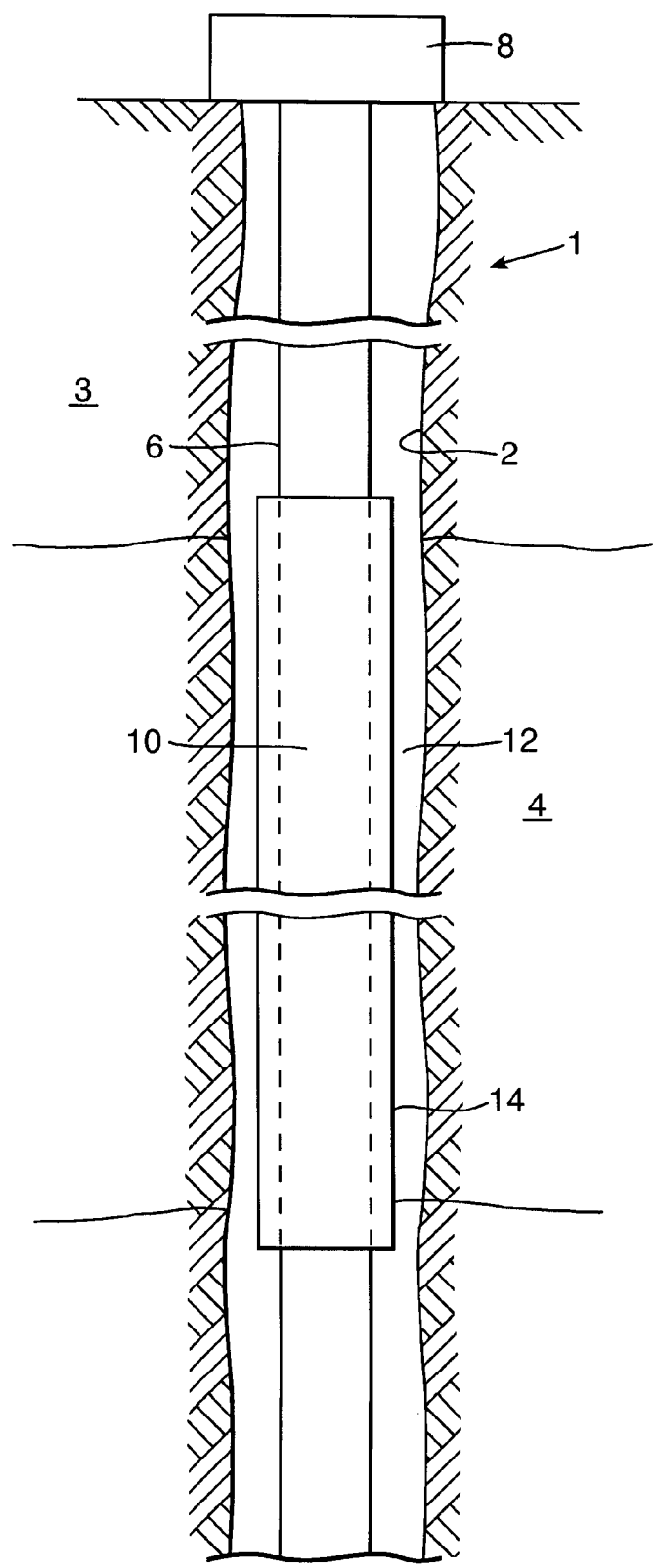

The present application claims priority from European Patent Application 0425819.5 filed on 15 Dec. 2004.

THE FIELD OF INVENTION

The present invention relates to a wellbore system comprising a wellbore formed in an earth formation, the wellbore passing through a salt layer of the earth formation formation and being provided with a tubular conduit having a portion extending through the salt layer.

BACKGROUND OF THE INVENTION

Salt in a salt formation behaves as a plastic and exhibits creep when subject to differential stresses. If a wellbore is drilled through the salt formation, the in-situ stresses in the region around the wellbore alter. For example, the horizontal in-situ stresses at the location of the wellbore before the wellbore is drilled, are replaced by horizontal stresses of magnitude corresponding to the hydraulic fluid pressure in the wellbore. If this fluid pressure is lower than the far field horizontal in-situ stresses in the salt formation, the salt in the vicinity of the wellbore will creep radially inward thus reducing the cross-sectional size of the borehole. Many times such radial deformation of the wellbore wall will be non-uniform, either in axial direction or in circumferential direction of the borehole. In view thereof, radial deformation of the wellbore wall can be more pronounced at some locations than at other locations so that a casing present in the wellbore can be subjected to locally high radial loading conditions as a result of the salt deformation. Non-uniform loading conditions can also occur if the borehole has an irregular shape due to, for example, washouts during drilling. Such irregularly shaped borehole will initially contact the casing at discrete points thereof due to creep of the salt formation and will thereby potentially cause local damage to the casing, for example by buckling of the casing. If the casing has been cemented in the borehole, the cement would normally fill the irregularities in the borehole and thus compensate for the non-uniform loading condition. However in many instances the cement not will not completely fill the borehole irregularities, especially if large washouts occur in the borehole.

SUMMARY OF INVENTION

The invention there is provides a wellbore system comprising a wellbore formed in an earth formation, the wellbore having a wellbore wall and extending into a salt layer of the earth formation, the wellbore system comprising a tubular conduit arranged in the wellbore whereby at least a portion of the tubular conduit is surrounded by the salt layer, wherein an annular space is formed between said portion of the tubular conduit and the wellbore wall, the wellbore system further comprising an annular body of a resilient material arranged in said annular space and extending substantially the length of said portion of the tubular conduit surrounded by the salt layer.

The present invention also relates to a method of creating a wellbore having a wellbore wall in an earth formation whereby the wellbore passes through a salt layer of the earth formation, the method comprising drilling said wellbore using a drilling fluid, arranging a tubular conduit in the wellbore wherein at least a portion of the tubular conduit is surrounded by the salt layer, and wherein an annular space is formed between said portion of the tubular conduit and the wellbore wall, the method further comprising arranging an annular body of a resilient material in the annular space so that the annular body extends substantially the lenght of said portion of the tubular conduit surrounded by salt layer, said resilient material being susceptible to swelling upon contact with the drilling fluid.

BREIF DESCRIPTION OF THE DRAWINGS

The invention will be explained hereinafter in more detail by way of example, with reference to the accompanying drawings in which:

FIG. 1 schematically shows an embodiment of the wellbore system according to the invention, before swelling of the swellable material in the wellbore; and FIG. 2 schematically shows an embodiment of the wellbore system according to the invention, after swelling of the swellable material in the wellbore.

DETAILED DESCRIPTION OF THE INVENTION

In one embodiment the annular body forms an annular layer provided to the outer surface of the tubular conduit, the annular layer extending continuously along sustantially the lenght of said portion of the tubular conduit surrounded by the salt layer.

Instead of providing a continous layer of resilient material in the annular space, a plurality of particles of resilient material can be inserted in the annular space to form a semi-continous resilient annular body.

It is preferred that said resilient material is a swellable material susceptible of swelling upon contact with a selected fluid. By swelling of the resilient material in the annular space, it is achieved that the resilient material fills up the annular space so that axial flow of wellbore fluid through the annular space is therby prevented. Moreover the swollen resilient material contacts the wellbore wall before significant creep of the salt formation occurs, and any tendency of the wellbore wall to deform non-uniformly is substantially offset by counter-pressure from the swollen resilient material.

In one embodiment the swellable material is an elastomer material, and the selected fluid is hydocarbon fluid.

For example, the swellable material comprises at least one of the group of natural rubber, nitrile rubber, hydrogenated nitrile rubber, acrylate butadiene rubber, poly acrylate rubber, butyl rubber, brominated butyl rubber, chlorinated butyl rubber, chlorinated polyethylene, neoprene rubber, styrene butadiene copolymer rubber, sulphonated polyethylene, ethylene acrylate rubber, epichlorohydrin ethylene oxide copolymer, ethylene-propylene-copolymer (perioxide croslinked), ethylene-propylmr-copolymer (sulphur crosslinked), ethylene-propylene-diene terpolymer rubber, ethylene vinyl acetate copolymer, fluoro rubbers, fluoro silicone rubber, and silicone rubbers.

Preferred swellable materials are EP(D)M rubber (ethylene-propylene-copolymer rubber, butyl rubber, brominated butyl rubber, chlorinated butyl rubber, and chlorinated polyethylene.

In one embodiment the hydrocarbon fluid is present in a stream of oil based drilling fluid pumped into the wellbore during drilling of the wellbore.

In one embodiment the resilient material is an elastomer susceptible of swelling upon contact with oil based drilling fluid, and wherein the wellbore is drilling using said oil based drilling fluid.

Alternatively the wellbore is drilled using a water based drilling fluid, and the resilient material is an elastomer susceptible to swelling upon contact with oil based fluid, ns wherein said oil based fluid is pumped into the annular space so as to replace water based drilling fluid present in the annular space.

Referring to FIG. 1 there is shown a wellbore system 1 including a wellbore 2 formed in an earth formation 3 having a salt layer 4 through which the wellbore 2 passes. A tubular conduit in the form of wellbore casing 6 extends from a wellhead 8 at surface, into the wellbore 2 whereby a portion 10 of the casing 6 extends through the salt layer 4. An annular space 12 is formed between the casing 6 and the wellbore wall. The portion 10 of casing 6 is provided with an annular layer 14 of EPDM rubber which is known to swell when in contact with hydrocarbon fluid, for example oil present in conventional oil based drilling fluid. The annular layer 14 has an initial thickness significantly smaller than the clearance between the casing 6 and the wellbore wall so as to allow unhampered lowering of the casing 6 with annular layer 14 provided thereto, into the wellbore 2.

Referring further to FIG. 2, there is shown the wellbore system 1 after swelling of the annular layer 14 of EPDM rubber due to contact of the layer 14 with oil based drilling fluid present in the wellbore. The swollen annular layer 14 extends radially against the wellbore annular layer 14 extends radially against the wall formed by the salt formation surrounding the wellbore 2. Thus, tha annular space 12 vanishes after swelling of the annular layer 14.

During normal operation the wellbore 2 is drilled in conventional manner using oil based drilling fluid. After drilling is completed, the casing 6 with the annular layer 14 provided thereto is lowered into the wellbore 2 and suspended in a position whereby the annular layer 14 extends substantially the length of the portion of the casing 6 passing through the salt layer 4. The annular layer of EPDM rubber thereby comes into contact with the oil based drilling fluid and starts swelling. Swelling of the layer 14 continues for a period of time which can last several days, until the annular layer 14 completely occupies the annular space 12 and thus becomes biased against the wellbore wall at moderate pressure.

The salt in salt formation 4 near the wellbore wall tends to creep radially inward so that the diameter of the wellbore portion passing through the salt layer 4 reduces slowly. As a result of the salt moving against the swollen annular layer 14, a compressive pressure builds up in the annular layer 14 of EPDM rubber. In many instances the salt will not uniformly creep radially inward along the length of the wellbore section passing through the salt layer 4. Thus, there can be locations where the wellbore diameter reduces more than at other locations due to the creeping salt, which would lead to locally severe loading conditions for the casing 6 if the rubber layer 14 would not be present between the casing 6 and the wellbore wall. Such severe loading is averted by the rubber annular layer 14 which deforms elastically due to the local load and thereby distributes the loading over a much larger area of the casing. The distributed load is of significantly lower magnitude than the high local loads to which the casing would be subjected in the absence of the annular layer 14, thus approaching uniform loading of the casing. In this manner it is achieved that failure of the casing due to locally severe loading conditions caused by non-uniform creeping of the salt, is prevented. Moreover, as a result of the more uniformly distributed compressive pressure between the salt at the wellbore wall and the swollen rubber layer, non-uniform creep of the salt along the length of the wellbore portion passing through the salt layer 4 is counteracted.

The swellable elastomer generates a pressure against the formation which delays the inflow of formation into the wellbore, and serves to spread concentrated loads acting on the casing from irregularities of the hole surface. The swelling pressure decreases with increasing amount of swelling and vice versa, i.e. there is an equilibrium between external pressures and internal pressures associated with the swelling mechanism. Thus, if after initial swelling of the elastomer the salt formation creeps radially inward and contacts the elastomer, the elastomer becomes locally compressed and exerts a back-pressure to maintain equilibrium. The swelling elastomer therefore not only out concentrated loads from the creeping salt formation, but also pushes the salt formation back at a progressively increasing elastic force.

In a suitable alternative application the annular body of resilient material includes an annular body of sand.

We claim:

1. A method of creating a wellbore having a wellbore wall in an earth formation comprising a salt layer, the method comprising drilling said wellbore so that the wellbore extends into the salt layer, arranging a tubular conduit in the wellbore wherein at least a portion of the tubular conduit is surrounded by the salt layer, and wherein an annular space is formed between said portion of the tubular conduit and the wellbore wall, the method further comprising arranging an annular body of a resilient material in the annular space so that the annular body extends substantially the length of said portion of the tubular conduit surrounded by the salt layer, said resilient material being susceptible to swelling upon contact with a selected fluid, and contacting said resilient material with the selected fluid; wherein the resilient material is an elastomer susceptible to swelling upon contact with oil based fluid, wherein the wellbore is drilled using a water based drilling fluid, and wherein said oil based fluids is pumped into the annular space so as to replace water based drilling fluid present in the annular space.

2. The method of claim 1, wherein the resilient material is an elastomer susceptible to swelling upon contact with oil based drilling fluid, and wherein the wellbore is drilled using said oil based drilling fluid.

3. The method of claim 1, wherein said oil based fluid is pumped into the wellbore as a stream in conjunction with a stream of cement for cementing the casing in the wellbore, the stream of oil based fluid and the stream of cement being spaced from each other.

4. The method of claim 1 wherein said annular body is provided as an annular layer to the outer surface of the tubular conduit, said annular layer extending continuously along substantially the length of said portion of the tubular conduit surrounded by the salt layer.

5. The method of claim 1 wherein the annular body is formed from a plurality of particles of resilient material inserted in said annular space.

6. The method of claim 1 wherein the oil based fluid is a hydrocarbon fluid.

7. The method of claim 1 wherein the swellable material is selected from the group consisting of natural rubber, nitrile rubber, hydrogenated nitrile rubber, acrylate butadiene rubber, poly acrylate rubber, butyl rubber, brominated butyl rubber, chlorinated butyl rubber, chlorinated polyethylene, neoprene rubber, styrene butadiene copolymer rubber, sulphonated polyethylene, ethylene acrylate rubber, epichlorohydrin ethylene oxide copolymer, ethylene-propylene-copolymer (peroxide crosslinked), ethylene-propylene-copolymer (sulphur crosslinked), ethylene-propylene-diene terpolymer rubber, ethylene vinyl acetate copolymer, fluoro rubbers, fluoro silicone rubber, and silicone rubbers.

8. The method of claim 1 wherein the swellable material is selected from the group consisting of EP(D)M rubber (ethylene-propylene-copolymer, either peroxide or sulphur crosslinked), EPT rubber (ethylene-propylene-diene terpolymer rubber), butyl rubber, brominated butyl rubber, chlorinated butyl rubber, and chlorinated polyethylene.

* * * * *